US006732974B1

(12) United States Patent
Lewis et al.

(10) Patent No.: US 6,732,974 B1
(45) Date of Patent: May 11, 2004

(54) TIPERON

(75) Inventors: Carl E. Lewis, Arlington, TX (US); Lindley A. Carlton, Chattanooga, TN (US); Richard E. Saeks, Chattanooga, TN (US)

(73) Assignee: Accurate Automation Corporation, Chattanooga, TN (US)

( * ) Notice: Subject to any disclaimer, the term of this patent is extended or adjusted under 35 U.S.C. 154(b) by 0 days.

(21) Appl. No.: 09/425,097

(22) Filed: Oct. 22, 1999

Related U.S. Application Data

(63) Continuation-in-part of application No. 08/974,529, filed on Nov. 19, 1997, now abandoned.

(51) Int. Cl.$^7$ ................................................. B64C 5/10

(52) U.S. Cl. ................................... 244/35 A; 244/90 R

(58) Field of Search ............................ 244/75, 2, 225, 244/90 R, 90 A, 179, 82, 35 A

(56) References Cited

U.S. PATENT DOCUMENTS

RE23,020 E * 7/1948 McKellar ..................... 244/13
3,971,532 A * 7/1976 Fountain ..................... 244/1 R

OTHER PUBLICATIONS

SR–71 Configurations, www.dfrc.nasa.gov.*
NACA Research Memorandum, Low–Speed Wind Tunnel Investigation OfA Fixed And A Free–Floating Wing–Tip AileronOn A Wing With Leading Edge Swept Back 51.3, MacLeod.*

* cited by examiner

Primary Examiner—Peter M. Poon
Assistant Examiner—Timothy D. Collins
(74) Attorney, Agent, or Firm—Eric P. Schellin

(57) ABSTRACT

A control surface for an air vehicle (e.g., an aircraft, rocket, or missile) is useful for flight control at both subsonic and supersonic speeds. The control surface defines the outboard-most tip of a flight structure (e.g., a wing, tail or other stabilizer) of the air vehicle. Hence, the control surface is referred to as a 'tiperon'. The tiperon has an approximately L-shaped configuration, and can be rotated relative to a fixed portion of the flight structure about a control axis. The respective surface areas of the tiperon sections forward and aft of the control axis are proportioned to place the subsonic center of pressure aft of the control axis to enhance aircraft control, and preferably also forward of the centroid of tiperon surface area. Also, the control surface sections forward and aft of the control axis are preferably mass-balanced, or at least nearly so, to enhance aircraft control at supersonic speeds. Either of the tiperon sections forward and aft of the control axis can be tapered to reduce the dependence of the moment exerted by air flow about the control axis, upon the tiperon's angle-of-attack. The tiperon also has enough surface area to control the air vehicle, even at low airspeeds. The invention is also directed to air vehicles incorporating one or more such control surfaces.

16 Claims, 7 Drawing Sheets

TIPERON

CROSS-REFERENCE TO RELATED APPLICATION

This application is a continuation-in-part of application Ser. No. 08/974,529, filed Nov. 19, 1997, now abandoned, naming Carl E. Lewis, Lindley A. Carlton, and Richard E. Sacks as the inventors.

STATEMENT OF GOVERNMENT RIGHTS IN THE INVENTION

This invention was developed under a Small Business Innovative Research project funded by the U.S. Government as represented by the NASA Langley Research Center under Contract No. NASI-20404. The U.S. Government has certain rights in the invention.

BACKGROUND OF THE INVENTION

1. Field of the Invention

This invention is directed to a control surface for controlling an air vehicle such as an aircraft, drone, rocket, missile, or the like. The invention is also directed to air vehicles incorporating the control surface.

2. Description of the Related Art

Aircraft are often required to have the ability to perform at subsonic as well as supersonic speeds. This is especially true of military aircraft. To make high- and low-speed performance possible, aircraft are often equipped with retractable wings with two different sets of control surfaces for high and low speeds. In low-speed operation, the wings are extended to increase lift of the aircraft, and relatively large, low-speed control surfaces are used for steerage. In high-speed operation, the wings are retracted into a delta configuration to reduce drag and lift, and relatively small high-speed control surfaces are used for aircraft control. U.S. Pat. No. 2,665,085 issued Jan. 5, 1954 to F. F. Crocombe et al. is representative of this aircraft type.

Although these aircraft have proven functional at subsonic and supersonic speeds, it is desirable to simplify the control surfaces and related equipment, and to eliminate the need for wing retraction and extension mechanisms, which greatly increase the complexity, expense and weight of the aircraft.

SUMMARY OF THE INVENTION

This invention overcomes the above-noted disadvantages. The invented apparatus includes at least one control surface having upper and lower major surfaces, that is positioned at the outboardmost tip of an air vehicle's flight structure. The flight structure can be any structure that extends outwardly from the air vehicle's central axis into the air stream, that provides airfoil lift and/or control in flight. For example, the flight structure can be a wing, a vertical or horizontal tail, or other stabilizer of an aircraft (including drones), a rocket or missile. The control surface is approximately L-shaped, and has upper and lower major surfaces extending along a single plane including perpendicular length-wise and span-wise dimensions which are the largest dimensions of the control surface. The control surface also has a relatively small dimension along the height-wise direction between the upper and lower surfaces of the control surface. The control surfaces defines the outboardmost tip relative to the air vehicle's central axis, or equivalently, the outboardmost leading and trailing edges of the flight structure to which it is mounted. Hence, the control surface is referred to as a 'tiperon'. The control surface is preferably mounted to a fixed portion of the flight structure for rotation about a control axis. For example, the control surface can be mounted to the air vehicle's flight structure with a set-back, serial, or piano hinge, or other suitable device. If implemented in a wing, the control surface is configured so that the subsonic and supersonic centers of pressure, and preferably also the subsonic and supersonic centroids of pressure area, are situated aft of the control axis on the underside thereof, and forward of the centroid of the surface area of the control surface. This relative positioning of the centers of pressure and centroids of pressure area relative to the control axis and centroid of surface area improves the stability of the air vehicle and facilitates its control. Such positioning of the centers of pressure and centroids of pressure area relative to the control axis and centroid of surface area is accomplished by proportioning the surface areas of control surface sections forward and aft of the control axis so that the section situated forward of the control axis has less surface area than does the section situated aft of the control axis, and by cambering of the control surface. Also, the control surface is preferably configured so that the mass forward and aft of the control axis is balanced, or substantially so, a feature which is important and possibly imperative for controlling the air vehicle at high speeds. Further, the control surface section situated forward of the control axis is tapered in cross-section along a plane of the length-wise and span-wise dimensions of the control surface, and has a tapered or wedge form in cross-section along a plane including span-wise and height-wise dimensions. The tapering of this section of the control surface reduces the dependence of the moment exerted by air flow upon the surface's angle-of-attack, and consequently, the surface can be more easily controlled. The control surface section that is situated aft of the control axis can be approximately rectangular or trapezoidal in cross-section along a plane including the length-wise and span-wise dimensions of the control surface. The aft section of the control surface preferably extends along the flight structure's span direction beyond the side edge of the control surface's tapered section forward of the control axis. The control surface section aft of the control axis is also tapered or wedge-shaped in cross-section along the plane parallel to the length-wise and height-wise dimensions. The control surface can be cambered to form an integral part of the flight structure's airfoil if the control surface is positioned about its control axis to be approximately flush or level with the remainder of the flight structure. In the case in which the flight structure is a wing, these features help to increase the air vehicle's lift, a benefit of considerable importance particularly in aircraft operation at low airspeeds. Such features also allow the aircraft to function effectively at low and high Mach-numbers at which the control surface's integration with the remainder of the flight structure can be important or critical, and at which relatively small deflections of the control surface can be used to control flight to the limits of the air vehicle's performance capability.

In one implementation, the control surface's leading edge defines an outer sweep of a double-delta wing platform. However, the control surface can be used in various ways in many kinds of air vehicles, including in the outboardmost or aftmost portion of a delta-wing aircraft's leading edge, the outboardmost tips of straight- or swept-wing aircraft, vertical or horizontal aircraft tails, or missile or rocket stabilizers or wings (as in the cruise missile), for example.

The invented aircraft includes a body with an integrated wing-body structure. Tiperon control surfaces as previously described are movably mounted to the port and starboard sides of the wing-body structure of the aircraft. Actuators are coupled to and control the positions of respective control surfaces. These actuators can be servomotors or hydraulically-actuated devices, for example. The actuators are in turn coupled to and controlled by the aircraft's flight control system (FCS). The FCS controls the actuators, and hence also the surfaces, based upon a control signal, and optionally also upon feedback signals from the actuators. The control signal can be generated by pilot or autopilot inputs generated onboard or remotely, an onboard processor or other device, or by the FCS itself, for example, to perform a desired or preprogrammed flight action or mission. The FCS can thus be used to control the angular position relative to the aircraft wing, of the two control surfaces about respective control axes, and thus to control the roll and pitch of the aircraft, and optionally also the aircraft's yaw attitude if no rudders are used. With the present invention, the aircraft's control can be greatly simplified by the use of only two control surfaces, and optionally one or more rudders. If desirable in a particular aircraft, the FCS can be omitted and mechanical linkages and levers coupled between the pilot's control instruments directly to the control surfaces, can be used to deflect the tiperon control surfaces for aircraft control. Also, for most wing designs, the control surface requires no trim tabs, a feature which further reduces aircraft control complication. In addition, if other control surfaces are present to control the aircraft's pitch attitude, the FCS and/or pilot can control the invented surfaces to deflect their leading edges upward with respect to fixed portions of the wing to act as landing flaps, or can deflect their leading edges downward with respect to fixed portions of the wing to act as spoilers to reduce the aircraft's speed.

These together with other features and advantages, which will become subsequently apparent, reside in the details of construction and operation as more fully hereinafter described and claimed, reference being made to the accompanying drawings, forming a part hereof, wherein like numerals refer to like parts throughout the several views.

DESCRIPTION OF THE PREFERRED EMBODIMENTS

As used herein, the following terms and phrases have the following meanings:

"Approximately L-shaped" is used in reference to a control surface configuration in which the surface has two sections extending transversely to one another, and joined or integrally formed together at their intersecting ends.

"Center of pressure" refers to the single position on a control surface at which a pressure of a particular magnitude can be applied with an equivalent result to the total effect of the pressures exerted by air flow at all points on the upper and lower surfaces of the control surface.

"Centroid of pressure area" is the point associated with a control surface which is the sum of the magnitude and position of all air pressure vectors acting on the upper and lower surfaces of a control surface.

"Centroid of surface area" refers to a geometric center of the surface area of a control surface.

Figure 1:
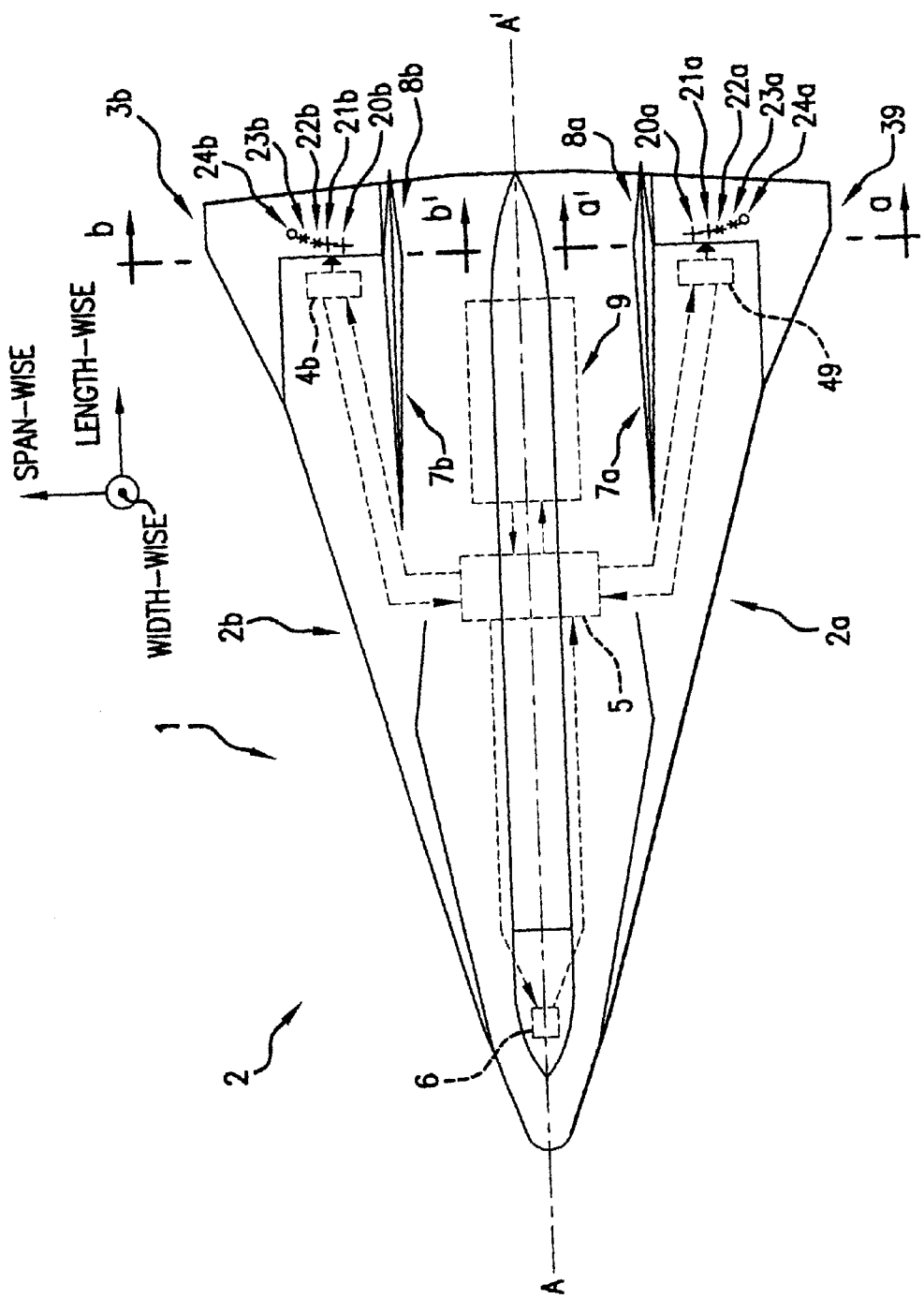
FIG. 1 is a top plan view of an air vehicle incorporating tiperon control surfaces in accordance with this invention.

In FIG. 1, an air vehicle 1 in accordance with this invention is shown. This particular air vehicle configuration, a double-delta wing aircraft, is used only by way of example of a preferred embodiment of the invention. The invention can be readily adapted to virtually any type of air vehicle, as will subsequently become apparent to those of ordinary skill in this technology upon studying the description and Figures for the invention provided herein. For ease in describing the control surfaces and other elements of the invention, the orientation or configuration of elements of the invention references orthogonal length-wise, span-wise, and height-wise dimensions or directions in the description and Figures.

As seen in FIG. 1, the air vehicle 1 has a wing-body structure 2. The term 'wing-body structure' refers to the fact that the air vehicle 1 of FIG. 1 has no distinct wings and horizontal tail stabilizers extending from a fuselage, as is the case with most conventional aircraft. Instead, the air vehicle 1 has a body that integrally constitutes the air vehicle's fuselage and wings. The wing-body structure 2 of the air vehicle 1 is elongated in its central symmetric axis A-A' which extends along the length-wise dimension of the air vehicle. The air vehicle 1 has port and starboard wing-body sides 2a, 2b that extend symmetrically outward (i.e., outboard) along the span-wise direction from the air vehicle's central axis A-A'. At the outboardmost port and starboard tips of the air vehicle 1, i.e., the outboardmost leading and trailing edges with respect to airflow over the air vehicle's surfaces, the air vehicle includes control surfaces 3a, 3b movably mounted to respective wing-body sides 2a, 2b for rotation about respective control axes a-a' and b-b'. The control axes are oriented along the span-wise direction. The control surfaces 3a, 3b may be referred to hereinafter as 'tiperons,' such name derived from a contraction of the words 'tip' and 'aileron' due to the fact that the control surfaces are disposed at the outboard tips of the wing-body sides 2a, 2b and perform functions of ailerons. The control surfaces 3a, 3b are approximately L-shaped in configuration, and have relatively smaller-sized sections extending from the control axes a-a', b-b' forwardly to the surfaces' leading edges along the length-wise direction, and relatively larger-sized sections extending from the control axes aft along the length-wise direction. In FIG. 1, the upper and lower major surfaces of the control surfaces 3a, 3b extend along a single plane including the length-wise and span-wise directions. The control surfaces 3a, 3b have relatively large dimensions from the forwardmost tips to the trailing edges of the control surfaces along the length-wise dimension and from the inboardmost to outboardmost portions of the control surfaces along the span-wise direction. The control surfaces 3a, 3b have no anhedral or cathedral surfaces formed by portions of the control surfaces that extend along transverse intersecting planes, which greatly increase the dependence of parameters such as lift, drag, and the direction of exertion of pressure by air flow over such control surfaces, based upon the angle-of-attack of such control surfaces about respective control axes a-a', b-b'. The maximum width between the upper and lower surfaces of the control surfaces 3a, 3b along the height-wise direction is relatively small, i.e., generally less than 35%, of the dimensions of the control surfaces along the length-wise and span-wise directions. If viewed in cross-section in the plane including the length-wise and span-wise directions, the control surfaces 3a, 3b have respective tapered triangular- or trapezoidal-shaped configurations from their control axes a-a', b-b' forward to the surfaces' leading edges, and rectangular or trapezoidal-shaped configurations from their respective control axes a-a', b-b' aftward to the surfaces' trailing edges. In the height-wise direction, the thickness of the control surfaces 3a, 3b can vary from the leading to trailing edges of such control surfaces along respective cross-sections taken along planes parallel to a plane including the length-wise and span-wise dimensions. More specifically, the control surfaces 3a, 3b can be tapered or wedge-shaped in cross-section along planes parallel to the plane including the length-wise and height-wise dimensions so that the upper and lower surfaces of such control surfaces are symmetric about an intersecting plane extending along the length-wise and span-wise directions in FIG. 1. More preferably at least with respect to the embodiment of FIG. 1, however, the control surfaces 3a, 3b are cambered by varying the thickness profiles of such surfaces asymmetrically from their leading to trailing edges along cross-sections taken parallel to a plane including the length-wise and height-wise directions so that such control surfaces have tapered or wedge-shaped cross-sections. The control surfaces 3a, 3b can be cambered uniformly with wing-body sides 2a, 2b assuming that the control surfaces 3a, 3b are positioned evenly or flush with the remainder of the wing-body sides 2a, 2b. In the air vehicle of FIG. 1, the control surfaces 3a, 3b are symmetrically disposed about the air vehicle's central axis A-A' and define the outer planform sweep of the air vehicle's double-delta configuration. The leading edges of the control surfaces are preferably less in length than the leading edges of the fixed portions of the wing so that the aerodynamic behavior of the wing-body structure 2 is not changed more than necessary upon moving the control surfaces. Also, the control surfaces extend in the span-wise direction along the wing-body structure to a degree sufficient to generate the control power needed for the particular air vehicle in which the control surfaces are installed, particularly at low airspeeds.

In FIG. 1, the control surfaces 3a, 3b are preferably configured so that the relative proportions of the surfaces' sections forward and aft of the control axes a-a', b-b', and the cambering of such surfaces, positions the subsonic centers of pressure 20a, 20b, and preferably also the subsonic centroids of pressure area 21a, 21b, just aft along the length-wise direction of the control axes on the undersides of the control surfaces. Preferably, the subsonic centers of pressure 20a, 20b and centroids of pressure area 21a, 21b are close to their respective control axes a-a', b-b', i.e., within the closest 25% of the distances from the respective control axes to the trailing edges of the control surfaces 3a, 3b. The relative proportioning of the surfaces' sections forward and aft of the control axes a-a', b-b', and the cambering of such surfaces, positions the supersonic centers of pressure 22a, 22b, and preferably also the supersonic centroids of pressure area 23a, 23b, aft of the subsonic centers of pressure 20a, 20b and the centroids of pressure area 21a, 21b on the undersides of the control surfaces 3a, 3b. In addition, the relative proportioning of the surfaces' sections forward and aft of the control axes a-a', b-b', and the cambering of such surfaces, positions the subsonic and supersonic centers of pressure 20a, 20b, 22a, 22b and the subsonic and supersonic centroids of pressure area 21a, 21b, 23a, 23b, forward of the centroids of surface area 24a, 24b of the control surfaces 3a, 3b. In FIG. 1, the positions of the subsonic and supersonic centers of pressure 20a, 20b, 22a, 22b, the subsonic centroids of pressure area 21a, 21b, 23a, 23b, and the supersonic centers of pressure 21a, 21b, and the centroid of surface areas 22a, 22b, are illustrated as projections along the height-wise direction onto the plane including the length-wise and span-wise directions. The centers of pressure would generally be located on the undersides of the control surfaces 3a, 3b due to the cambering of such surfaces, and the centroids of pressure area would generally lie within the control surfaces. The relative positioning of the centers of pressure 20a, 20b, 21a, 21b, the centroids of pressure area 22a, 22b, 23a, 23b, and the centroids of surface areas 24a, 24b, helps to ensure that the control surfaces 3a, 3b will not be subject to control instabilities such as flutter at low-speeds and/or buffeting at high-speeds.

The control surfaces are preferably mounted for rotation about respective control axes a-a' and b-b' to respective fixed portions of the air vehicle's wing-body structure. The control surfaces can be mounted to the air vehicle with respective set-back, serial or piano-type hinges, for example. The air vehicle also includes actuators 4a, 4b that are coupled to respective control surfaces. The actuators are shown in broken line to indicate the fact that they are positioned in the interior of the air vehicle, as will be other elements yet to be described in detail. The actuators can be used to rotate the control surfaces about respective control axes, and thus to control the respective angular positions of the control surfaces 3a, 3b with respect to the fixed wing-body sides 2a, 2b. The air vehicle further includes a flight control system (FCS) 5 that is coupled to supply respective actuator signals (in either analog or digital form) to the actuators 4a, 4b for control thereof, and that optionally can be coupled to receive feedback signals from respective actuators to indicate the angular positions, for example, of the control surfaces. If manned, the air vehicle can include control instruments 6 (such as a yoke, stick, rudder pedals, etc.) that generate the pilot's control signal, and that are coupled to supply the pilot's control signal to the FCS. The air vehicle can also be unmanned in which case the FCS can receive a control signal generated remotely and transmitted to the FCS, or alternatively, the FCS or other onboard controller (not shown) can be preprogrammed to generate a control signal to perform a particular function or mission. In the particular air vehicle shown in FIG. 1, the air vehicle includes vertical stabilizers 7a, 7b with respective rudders 8a, 8b. The rudders 8a, 8b are controlled with respective actuators (not shown) that in turn are coupled to the FCS 5 for the control thereof. Based on the control signal, the FCS generates actuator signals supplied to the rudders' actuators, in addition to the actuators 4a, 4b for the control of the tiperons 3a, 3b. The air vehicle also includes a propulsion system 9 to propel the air vehicle, that can be coupled to the FCS 5. The FCS 5 can generate a propulsion signal, based on the control signal. Optionally, the FCS 5 can be coupled to receive a propulsion feedback signal generated by the propulsion system 9, and can use such signal together with the control signal to generate the propulsion signal. Such propulsion feedback signal can be indicative of the amount of power output by the propulsion system, and/or the direction of vectoring of the thrust of the propulsion system.

Figure 2:
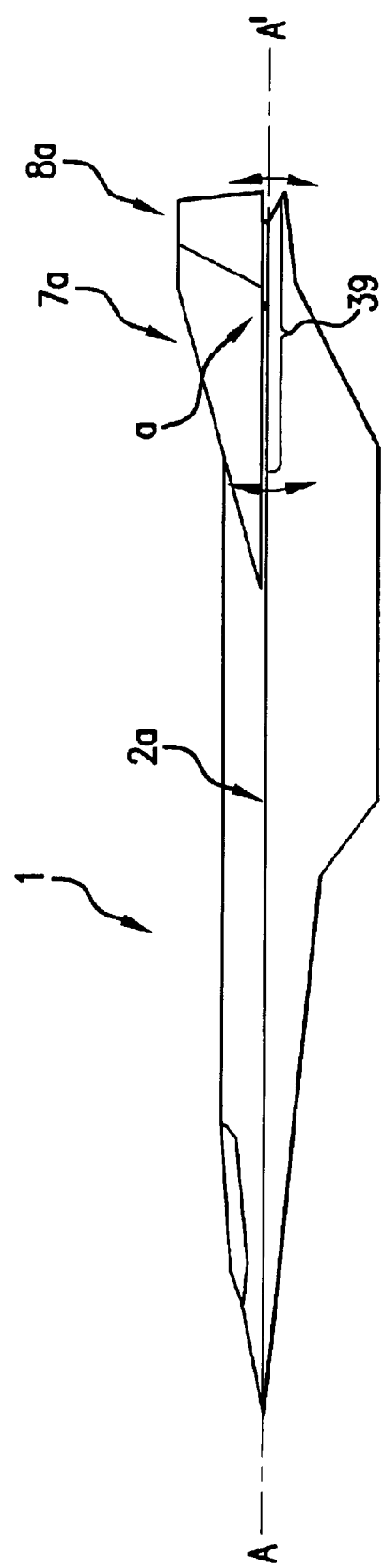
FIG. 2 is a side elevation view of the air vehicle of FIG. 1.

FIG. 2 shows the air vehicle 1 of FIG. 1 as it appears when viewed in side elevation. FIG. 2 is provided herein to give another view that further illustrates the configuration and manner in which the tiperon 3a is implemented in the air vehicle of FIG. 1. The tiperon 3b would appear similarly to tiperon 3a if viewed from the opposite side of the air vehicle.

The tiperon 3a, like the tiperon 3b, can be rotated about its control axis, as indicated by the arrows in FIG. 2, to control the air vehicle 1 in flight.

Figure 3:
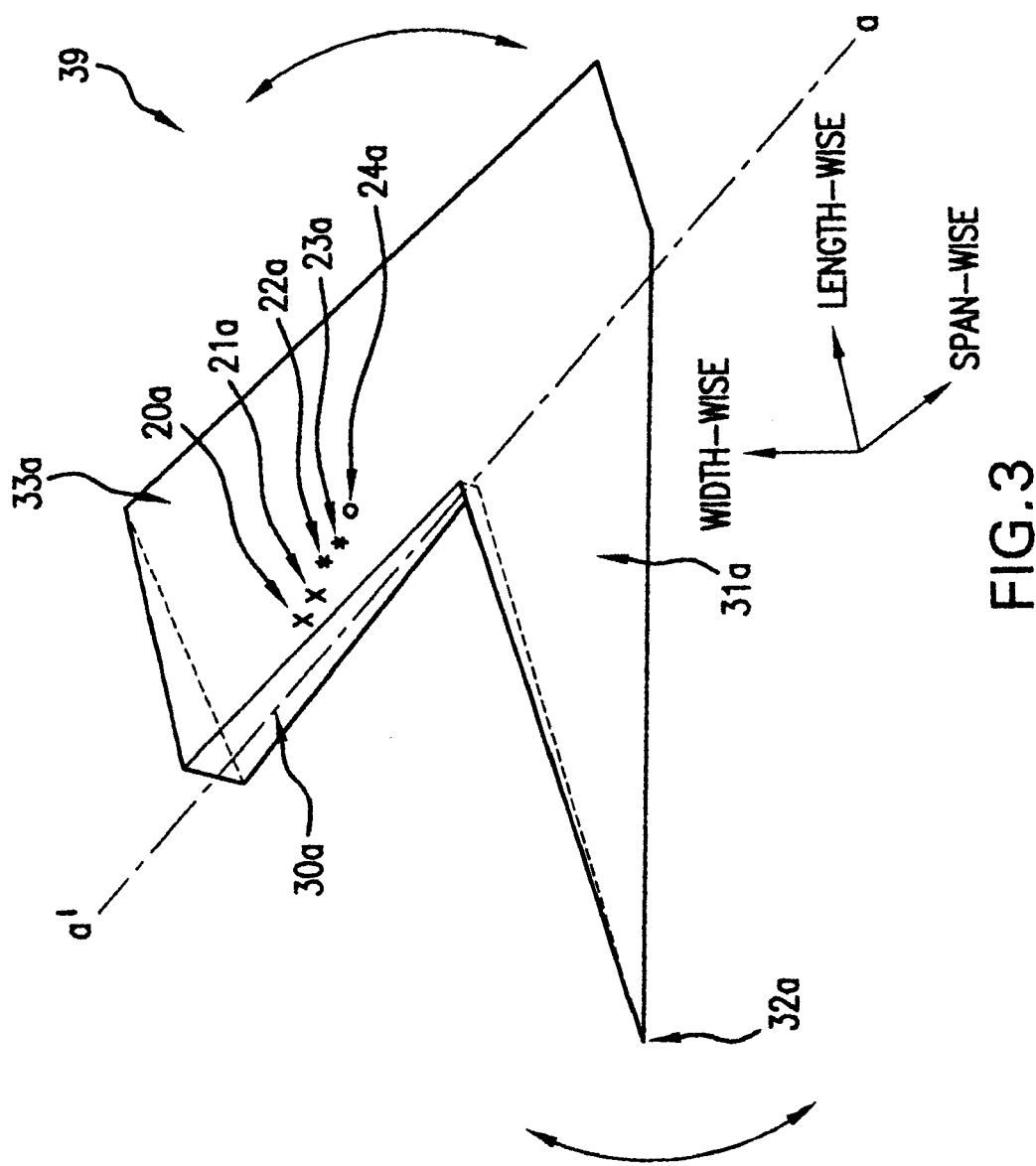
FIG. 3 is a three-dimensional perspective view of a tiperon control surface in accordance with this invention.

FIG. 3 is a relatively detailed view of the port side control surface 3a of FIGS. 1 and 2. The control surface 3b will be readily understood from the following description, as it is simply the symmetrical reverse (i.e., mirror image) of the control surface 3a. In FIG. 3, the broken line of the surface 3a indicates the control surface's edges that would be blocked from view in the perspective given in FIG. 3. As can be seen in FIG. 3, the control surface 3a is approximately L-shaped in configuration. The control surface can be mounted to a hinge or like device at face 30a that extends along the control axis a-a' of the surface 3a. The control surface can be rotated about its control axis a-a', as indicated by the arrows in FIG. 3. Forward of the control axis a-a', the control surface 3a includes a section 31a that tapers along the length-wise direction to a tip 32a. The tapering of the section 31a helps to reduce the dependence of the moment acting to rotate the surface 3a about its control axis a-a' upon the angular position (or angle-of-attack) of the control surface 3a, and thus facilitates control of such surface. Aft of the control axis a-a', the control surface 3a includes a section 33a that is approximately rectangular in shape, and that preferably extends inboardly along the span-wise direction past the inboard side edge of the section 31a. As previously indicated, the control surface 3a is preferably configured so that its subsonic center of pressure 20a, and also the subsonic centroid of pressure area 21a, exerted on the surface's underside is aft of the control axis a-a', and forward of the centroid of control surface area 24a. This is accomplished by shaping the control surface with an appropriate camber and so that the surface area of the section 31a situated forward of the control axis a-a' is less than the surface area of the section 33a situated aft of the control axis a-a'. Also, with the appropriate proportioning of the sections 31a, 33a and the appropriate camber of the upper and lower surfaces of the control surface 3a, the supersonic center of pressure 22a and the supersonic centroid of pressure area 23a acting on the control surface 3a are positioned between the subsonic center of pressure 20a and the subsonic centroid of pressure area 21a, and the centroid of surface area 24a. The surface area of the section 31a should be less than, and preferably at least ninety percent (95%) of; the surface area of the section 33a. In addition, the tiperon sections forward and aft of the control axis are preferably mass-balanced about the control axis to facilitate surface control, particularly at high airspeeds. This mass-balancing can be accomplished by appropriately proportioning materials constituting the tiperon both forward and aft of the control axis in the tiperon's design and/or by removing or adding material in the interior of the tiperon as necessary to achieve a balance. The tiperon control surface can be made in a variety of ways, including through the use of a structural frame that is covered with an external surface, or with an integral piece of material that is molded or otherwise produced with the appropriate form. The structural frame, external surface or integral piece can be made of metal or alloys, preferably lightweight types, plastic, or composite materials, for example. The control surface 3a can be cambered to form an integral portion of the airfoil of the wing-body side 2a when the control surface is positioned to be approximately coplanar or level with the remainder of the wing. This feature of the invented control surface is particularly important to contributing lift to assist air vehicle flight at low airspeeds, and also to facilitating aerodynamic integrity, lift, trim and control at high speeds.

In operation, referring to FIGS. 1–3, the FCS 5 receives or generates the control signal and optionally also receives the feedback signals from the actuators 4a, 4b. Based on these signals, the FCS 5 generates actuator control signals supplied to the actuators 4a, 4b, and the propulsion signal supplied to the propulsion system 9. The actuators 4a, 4b control the angular positions of control surfaces 3a, 3b about respective control axes a-a', b-b' to control the air vehicle's flight. In the particular air vehicle of FIGS. 1 and 2, the control surfaces 3a, 3b are used primarily to control the roll and pitch attitudes of the air vehicle, and the FCS 5 generates actuator signals supplied to actuators (not shown) associated with respective rudders 8a, 8b to control the yaw attitude of the air vehicle. As is generally understood by those of ordinary skill in this technology, lowering the leading edge of the control surface 3a with respect to zero angle-of-attack will tend to cause the wing-body side 2a to lower and thus roll the aircraft about its central axis, and the increased drag of the surface 3a in this attitude tends to cause the aircraft to yaw to port. Conversely, lowering the leading edge of the control surface 3b with respect to zero angle-of-attack tends to cause the wing 2b to lower and thus roll the aircraft, and its increased drag tends to cause the aircraft to yaw to starboard. Raising the leading edge of one of the surfaces 3a, 3b with respect to zero angle-of-attack will raise the respective wing 2a, 2b and thus tend to roll the aircraft about its central axis. Raising the leading edges of both control surfaces 3a, 3b with respect to zero angle-of-attack causes the aircraft to pitch downward, and lowering the leading edges of surfaces 3a, 3b with respect to zero angle-of-attack causes the aircraft to pitch upward. Based on the control signal, the FCS generates the actuator signals to control the actuators 4a, 4b to move the surfaces 3a, 3b based on the above-stated control generalities. The FCS also generates a control signal supplied to the air vehicle's propulsion system 9 to control the air vehicle's power and optionally also its direction of thrust. As indicated above, it is possible that the control surfaces 3a, 3b can be used to control the yaw of the air vehicle in addition to its pitch and roll, in which case the rudders 8a, 8b and associated actuators would not be necessary. In this case, air vehicle control is greatly simplified to only two control surfaces 3a, 3b, and the tail structures may be omitted to reduce the air vehicle's radar profile, and hence its detectability. In an alternative configuration, the control of the surfaces 3a, 3b could be accomplished by direct mechanical linkages and levers, for example, coupled to a control stick and rudder pedals or other instruments that are operated by a pilot, in which case the FCS could be omitted.

Figure 4:
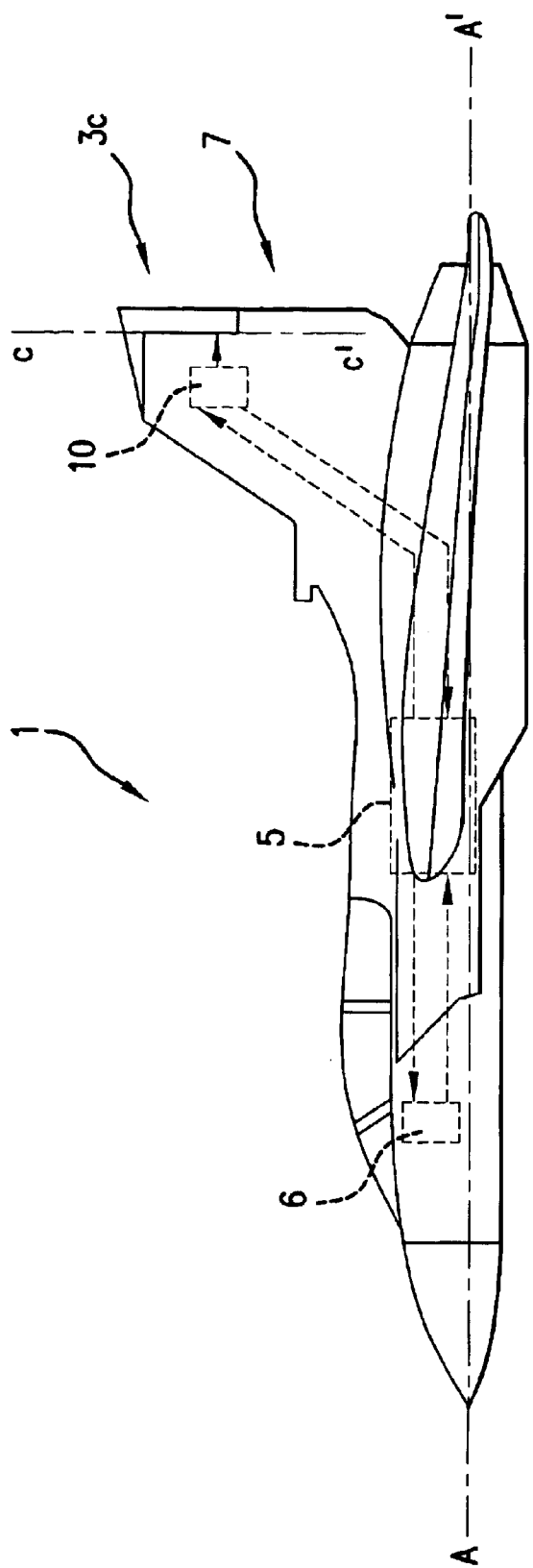
FIG. 4 is a side elevation view of an aircraft with a tiperon control surface on its vertical tail.

In FIG. 4, a tiperon control surface 3c is used in the vertical tail of an air vehicle 1. The tiperon 3c is coupled with a hinge or the like to the air vehicle's tail 7, and is also coupled to an actuator 10 that rotates the tiperon about its control axis based on an actuator signal. The actuator 10 is coupled to the FCS 5 which generates the actuator signal based on a control signal that the FCS receives from the pilot via instruments 6, by an onboard or remote controller external to the FCS, or that is generated within the FCS itself, based upon preprogramming or remote piloting. The FCS can also be coupled to receive a feedback signal from the actuator 10 indicating the angular position of the tiperon relative to the fixed remainder of the vertical tail 7, for use in generating the actuator signal supplied to the actuator 10. Thus, based upon the control signal and/or feedback signal, the FCS 5 controls the angular position of the control surface 3c via actuator 10 to control the air vehicle's yaw attitude, for example, to turn the aircraft to port or starboard.

Figure 5:
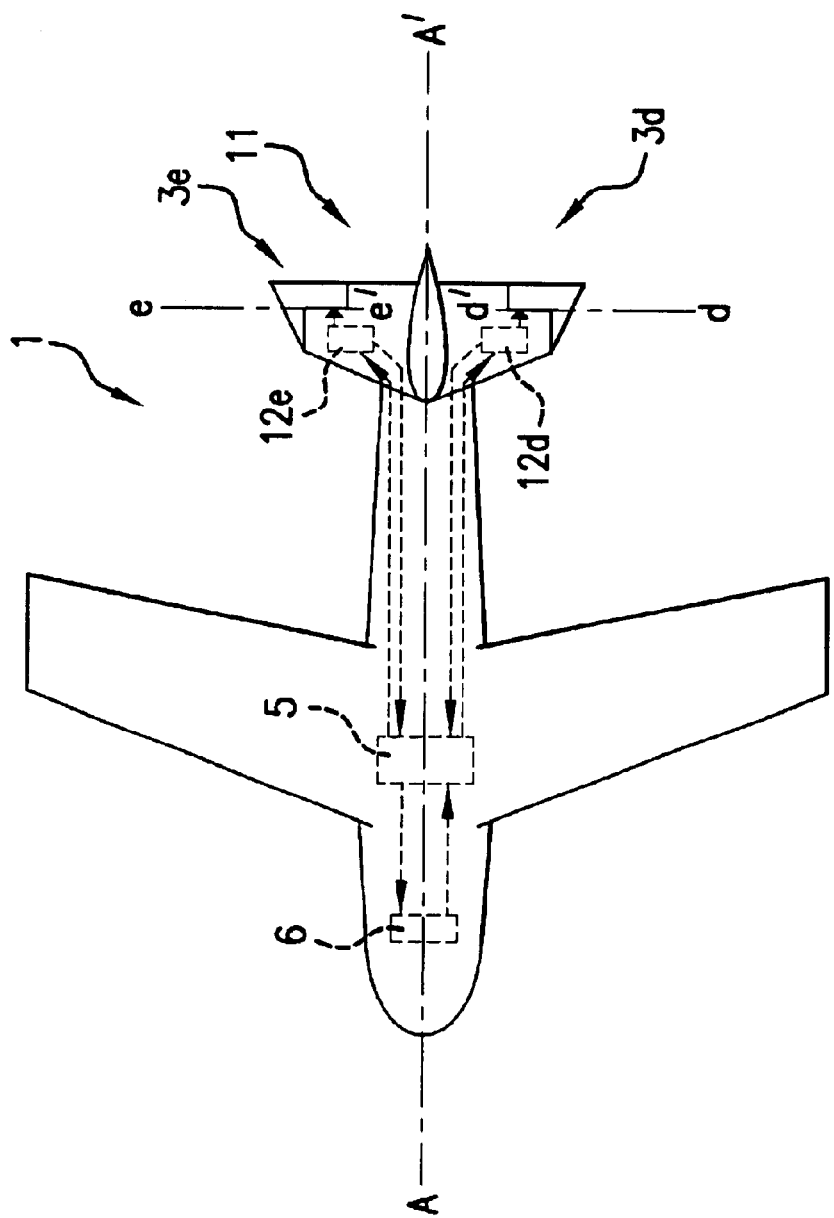
FIG. 5 is a top plan view of an aircraft with tiperon control surfaces on outboardmost tips of its horizontal tail.

FIG. 5 demonstrates the invented tiperons 3d, 3e as applied to a horizontal tail 11. Actuators 12d, 12e are coupled between the FCS 5 and the tiperons 3d, 3e, respectively, to control the angular positions of the tiperons 3d, 3e with respect to the fixed portions of the tail. As described in previous Figures, the FCS can be coupled to receive a control signal from the pilot via instruments 6, generated internally in the FCS 5, or by controller external to the FCS. The FCS can as well be coupled to receive feedback signals from the actuators. Based on the control and/or feedback signals, the FCS can control the angular position of the control surfaces 3d, 3e via actuators 12d, 12e, and hence also the air vehicle's pitch or roll attitudes.

Figure 6:
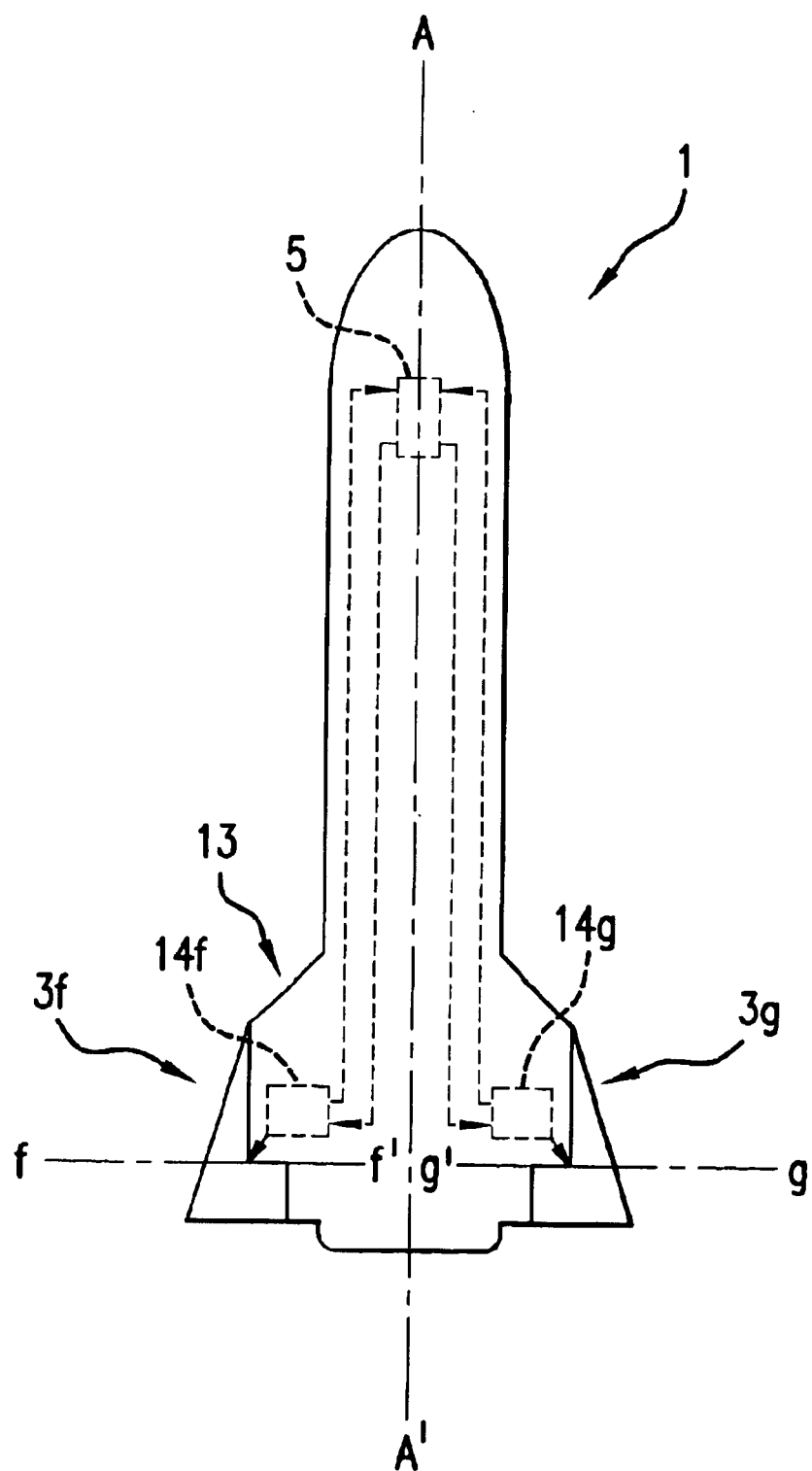
FIG. 6 is a side elevation view of a rocket equipped with tiperon control surfaces on its stabilizers.

FIG. 6 illustrates the invented tiperons 3f, 3g applied to the vertical stabilizers of an air vehicle 1 which in this case is an unmanned rocket. The tiperons 3f, 3g are mounted for rotation via hinges or the like about respective control axes f-f' and g-g', and are coupled to respective actuators 14f, 14g which can rotate the tiperons 3f, 3g about respective control axes to control their angular positions with respect to fixed portions of the stabilizers. The actuators are coupled to and controlled by the FCS 5 based on a control signal generated internally to the FCS or remotely via wireless communication, for example, and may also generate the actuator signals for the actuators 14f, 14g based upon respective feedback signals therefrom. In addition to the directional control of the rocket, the FCS 5 can control the tiperons 3f, 3g via respective actuators 14f, 14g to rotate the rocket about its central axis A-A', an action that can be used to increase the stability of the rocket in flight.

Figure 7A:
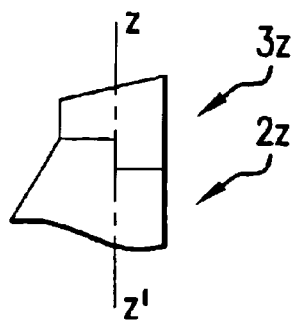
FIGS. 7A–7F are views of variations of tiperon control surface configurations.
Figure 7B:
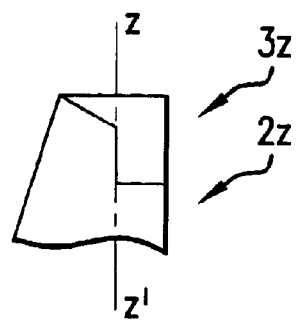
Figure 7C:
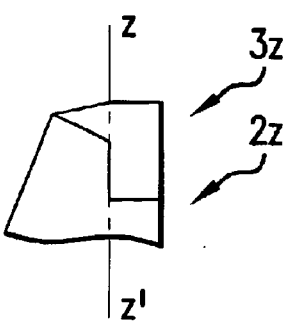
Figure 7D:
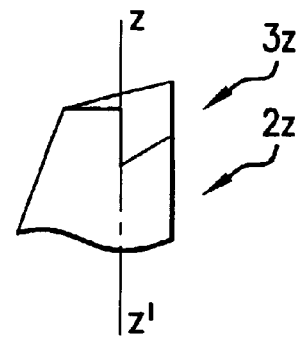
Figure 7E:
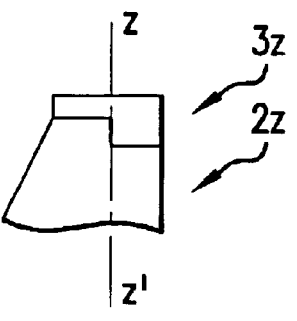
Figure 7F:
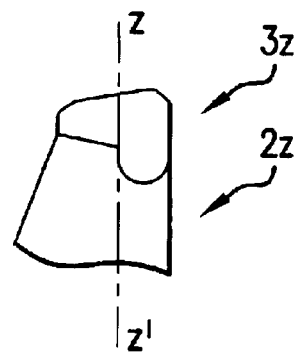

FIGS. 7A–7F illustrate several variations of the invented tiperon control surface that are intended to fall within the scope of the claimed invention. The control surface 3z of FIG. 7A differs relative to the embodiments previously described in that the control surface section forward of the control axis z-z' has a straight leading edge. In FIG. 7B, the outboardmost edge of the control surface is parallel to the air vehicle's central axis while the inboardmost edge of the control surface forward of the control axis is angled to form a moment-reducing taper. In FIG. 7C, both side edges of the control surface section forward of the control axis are angled with respect to the air vehicle's central axis. In FIG. 7D, in addition to the section forward of the control axis, the section aft of the control axis is tapered on one side edge. The section aft of the control axis could as well be tapered on its opposite side edge or both side edges. In FIG. 7E, neither the sections forward nor aft of the control axis are tapered. In FIG. 7F, the edges of the control surface are rounded or smoothed. All of these tiperon configurations, as shown herein or in combination with other configurations, or such modifications of the disclosed configurations as may readily occur to those of ordinary skill in the art, and equivalents thereof, are intended to be included within the scope of the claimed invention.

In the foregoing Figures, it should be appreciated that if the actuator and feedback signals are electronic, the lines between the FCS 5 and the various actuators could be replaced with a bi-directional bus instead of using separate lines for the actuator signals and feedback signals. Likewise, the two lines between the FCS and the instruments 6 could be replaced with a bi-directional bus for carrying the actuator signals and feedback signals if in electronic form, and in addition, such bus could also serve to transfer electronic actuator and feedback signals between the FCS and actuators. These variations are intended to be within the scope of this invention.

Some of the advantageous features of the invented tiperon control surface that enable it to control an air vehicle over its entire range of operation are summarized as follows:

(1) the control surface is disposed at the outboardmost tip, and constitutes the leading and trailing edges, of an air vehicle's flight structure. As so positioned, the 'tiperon can be used to induce maximal or near-maximal torque upon the flight structure for air vehicle control;

(2) if used on a wing, the control surface area of the section forward and aft of the control axis are preferably proportioned so that the subsonic center of pressure, and preferably also the subsonic centroid of pressure area, is aft of the control axis on the underside of the surface, and the supersonic center of pressure, and preferably also the supersonic centroid of pressure area, is aft of both the subsonic center of pressure and the subsonic centroid of pressure area, but forward of the control surface's centroid of surface area. This configuration greatly enhances air vehicle control at both subsonic and supersonic speeds;

(3) the mass of the control surface sections forward and aft of the control axis are preferably substantially balanced to facilitate control, particularly at supersonic speeds;

(4) the control surface's area is sufficiently large to generate enough control power to effectively control an air vehicle, particularly at low speeds;

(5) either or both sections of the tiperon forward or aft of the control axis can be tapered to reduce dependence of the moment exerted by air flow upon the tiperon's angle-of-attack, to facilitate control of the air vehicle.

The many features and advantages of the present invention are apparent from the detailed specification and thus it is intended by the appended claims to cover all such features and advantages of the described apparatus and air vehicles which follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

What is claimed is:

1. An apparatus for controlling a supersonic air vehicle, the apparatus attached to said vehicle and mounted for rotation about a control axis to control the air vehicle, the apparatus comprising an approximately L-shaped control surface having upper and lower major surfaces extending along a single plane including perpendicular length-wise and span-wise dimensions which constitute the largest dimensions of the control surface, the control surface constituting the outboardmost leading and trailing edges of a flight structure of the air vehicle, the control surface having a relatively short height-wise dimension extending between the upper and lower major surfaces of the control surface in a direction perpendicular to the length-wise and span-wise dimensions, the control surface having a section forward of the control axis that tapers in a plane including the length-wise and span-wise dimensions, and that is wedge-shaped in cross-section along a plane parallel to the length-wise and height-wise dimensions, the control surface further having a section aft of the control axis that is rectangular or trapezoidal in cross-section in the plane including the length-wise and span-wise dimensions, and that is wedge-shaped in cross-section along the plane parallel to the length-wise and height-wise dimensions, the relative proportioning of the surface areas of the control surface sections forward and aft of the control axis, and the cambering of the control surface, positioning the subsonic and supersonic centers of pressure and subsonic and supersonic centroids of pressure area aft of the control axis and forward of a surface area centroid of the control surface, the supersonic center of pressure and the supersonic centroid of pressure area being further aft than the subsonic center of pressure and the subsonic centroid of pressure area.

2. An apparatus as claimed in claim 1, wherein the section of the control surface situated forward of the control axis tapers to a tip.

3. An apparatus as claimed in claim 1, wherein the section of the control surface situated forward of the control axis tapers to a straight leading edge.

4. An apparatus as claimed in claim 1, wherein the section of the control surface that is situated aft of the control axis is tapered.

5. An apparatus as claimed in claim 1, wherein the section of the control surface aft of the control axis extends inboardly along the flight structure toward the air vehicle's central axis beyond the tapered section's side edge.

6. An apparatus as claimed in claim 1, wherein the surface area of the section of the control surface that is situated forward of the control axis is less than the surface area of the section of the control surface that is situated aft of the control axis.

7. An apparatus as claimed in claim 1, wherein masses of the control surface sections situated forward and aft of the control axis are proportional so that the control surface is substantially mass-balanced about the control axis.

8. An apparatus as claimed in claim 1, wherein the leading edge of the control surface is less in length than the leading edge of a fixed portion of the flight structure.

9. An apparatus as claimed in claim 1, wherein the control surface has a span that is less than the flight structure's span.

10. A supersonic aircraft comprising:

a wing-body structure elongated along a central axis, and having wing-body sides extending outboardly from the central axis along a span direction of the wing-body; and port and starboard control surfaces for controlling the air vehicle, mounted for rotation about respective control axes to control the air vehicle, the port and starboard control surfaces approximately L-shaped in configuration, the control surfaces having upper and lower major surfaces extending along a single plane including perpendicular length-wise and span-wise dimensions which constitute the largest dimensions of the control surfaces, the control surfaces constituting the outboardmost leading and trailing edges of the wing-body structure of the air vehicle, the control surfaces having relatively short height-wise dimensions extending between the upper and lower major surfaces of the control surfaces in a direction perpendicular to the length-wise and span-wise dimensions, the control surface having sections forward of respective control axes that taper in a plane including the length-wise and span-wise dimensions, and that is wedge-shaped in cross-section along planes parallel to the length-wise and height-wise dimensions, the control surfaces further having sections aft of the control axes that are rectangular or trapezoidal in cross-section in the plane including the length-wise and span-wise dimensions, and that are wedge-shaped in cross-section along planes parallel to the length-wise and height-wise dimensions, the relative proportioning of the surface areas of the control surface sections forward and aft of the control axes, and the cambering of the control surfaces, positioning the subsonic and supersonic centers of pressure and subsonic and supersonic centroids of pressure area aft of the control axes and forward of respective surface area centroids of the control surface, the supersonic centers of pressure and the supersonic centroids of pressure area being further aft than the subsonic centers of pressure and the subsonic centroids of pressure area for the respective control surfaces.

11. An aircraft as claimed in claim 10, wherein the aircraft is controlled with a control signal, the aircraft further comprising:

a first actuator coupled to rotate the port control surface about the port control axis;

a second actuator coupled to rotate the starboard control surface about the starboard control axis; and a flight control system (FCS) positioned in the body, coupled to receive the control signal, and coupled to the first and second actuators, for controlling the angular positions of the port and starboard control surfaces via the first and second actuators to control the aircraft.

12. An aircraft as claimed in claim 11, wherein the FCS controls the first and second actuators to position respective port and starboard control surfaces in different attitudes to induce the aircraft to roll.

13. An aircraft as claimed in claim 11, wherein the FCS controls the first and second actuators to position respective port and starboard control surfaces in different attitudes to induce the aircraft to yaw.

14. An aircraft as claimed in claim 11, wherein the FCS controls the port and starboard control surfaces to tilt in the same direction relative to the aircraft's central symmetric axis to induce the aircraft to pitch.

15. An aircraft as claimed in claim 11, wherein the FCS controls the port and starboard control surfaces so that their leading edges are angled downward with respect to the aircraft's central axis to act as landing flaps.

16. An aircraft as claimed in claim 11, wherein the FCS controls the port and starboard control surfaces so that their leading edges are angled upward with respect to the aircraft's central axis to act as spoilers.

* * * * *